(12) United States Patent
Badeer

(10) Patent No.: US 6,393,823 B1
(45) Date of Patent: May 28, 2002

(54) METHODS FOR FUEL NOZZLE STAGING FOR GAS TURBINE ENGINES

(75) Inventor: Gilbert H. Badeer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/434,343

(22) Filed: Nov. 5, 1999

(51) Int. Cl.⁷ ................................................ F02C 3/30
(52) U.S. Cl. ........................ 60/39.05; 60/39.58; 60/739
(58) Field of Search ................................ 60/39.05, 39.06, 60/39.463, 39.55, 39.58, 739

(56) References Cited

U.S. PATENT DOCUMENTS

| | | | |
|---|---|---|---|
| 3,991,561 A | * 11/1976 | Leto | ............................ 60/739 |
| 4,259,837 A | 4/1981 | Russell et al. | |
| 4,716,719 A | 1/1988 | Takahashi et al. | |
| 5,036,657 A | 8/1991 | Seto et al. | |
| 5,261,222 A | 11/1993 | Napoli | |
| 5,271,218 A | * 12/1993 | Tatlor | ........................... 60/739 |
| 5,361,578 A | * 11/1994 | Donlan | ...................... 60/39.55 |
| 5,540,045 A | * 7/1996 | Corbett et al. | ............. 60/39.55 |
| 5,722,230 A | * 3/1998 | Cohen et al. | .................. 60/739 |

* cited by examiner

Primary Examiner—Louis J. Casaregola
(74) Attorney, Agent, or Firm—William Scott Andes; Armstrong Teasdale LLP

(57) ABSTRACT

A fuel delivery system for fuel nozzle staging includes a gas circuit and a fuel circuit. Each circuit includes a first manifold and a second manifold. The fuel delivery system delivers a first gas and a first fuel to a gas turbine engine during initial operation through the first manifold connected within each respective gas circuit. As the gas turbine engine reaches a predetermined operational speed, staging valves permit the fuel delivery system to also deliver the first gas and the first fuel to the gas turbine engine through the second manifold of each respective gas circuit.

6 Claims, 2 Drawing Sheets

METHODS FOR FUEL NOZZLE STAGING FOR GAS TURBINE ENGINES

BACKGROUND OF THE INVENTION

This invention relates generally to gas turbine engines and, more particularly, to fuel delivery systems for fuel nozzle staging for gas turbine engines.

Controlling a pressure ratio of fuels delivered to a dual fuel gas turbine engine is critical for the engine's performance. Typically, dual fuel gas turbine engines exhibit operability limitations during normal engine starts and during engine low power operating conditions. For example, undesirable engine flameouts are prevalent in gas turbine engines supplied with gas and steam premix, or dual fuel (gas and liquid), and in steam premix turbines as a result of the low fuel flow rates supplied during start conditions. Additionally, flameouts may occur at steady state fuel flow conditions in gas turbine engines when low pressure differentials develop at the fuel nozzle tips, i.e., single annular combustor (SAC) fuel configuration.

To compound the flammability problem, typically the performance of gas turbine engine fuel delivery systems are optimized to be within acceptable performance ranges when the gas turbine engines are operating at maximum fuel flow conditions. While optimizing a fuel delivery system to perform at maximum fuel flow conditions enhances the performance of the gas turbine engine during high fuel flow conditions, it also increases the possibility of flameouts during low fuel flow conditions. Fuel nozzle pressures can be raised to alleviate flammability operability regions of the engine. However, raising the fuel nozzle pressures to improve the flammability levels at low fuel flow conditions may cause excessive and damaging pressures at maximum fuel flow conditions, where the engine operates more frequently. Additionally, optimizing the fuel delivery systems at low fuel flow conditions may increase carbon monoxide emission levels generated by the gas turbine engine, thus creating potential environmental issues.

BRIEF SUMMARY OF THE INVENTION

In an exemplary embodiment, a fuel delivery system for fuel nozzle staging is provided for use with a gas turbine engine. The fuel delivery system includes two circuits. A gas circuit delivers fuel to the gas turbine engine, and includes a primary manifold and a secondary manifold. A steam circuit delivers steam to the gas turbine engine and includes a primary manifold and a secondary manifold. Both the gas circuit and the steam circuit are connected to a plurality of fuel nozzles which include primary fuel nozzles and secondary fuel nozzles. Additionally, both circuits include a staging valve to control the flow of each respective gas and steam into each respective circuit's second manifold.

During operation, the gas circuit primary manifold and the steam circuit primary manifold deliver fuel and steam respectively to the gas turbine engine during initial operation and idle operation of the gas turbine engine. During initial operations and idle operations, the primary fuel nozzles deliver the first fuel and steam to the gas turbine engine. Once the gas turbine engine reaches a predetermined operational speed, the staging valves open and direct fuel and steam into the secondary fuel nozzles. As a result of such fuel nozzle staging, the fuel and control system eliminates more detrimental fuel delivery systems and provides a user with a fuel delivery system which improves flammability limits, accurately controls the delivery of fuel, and provides flexibility to the user.

DETAILED DESCRIPTION OF THE INVENTION

Figure 1:
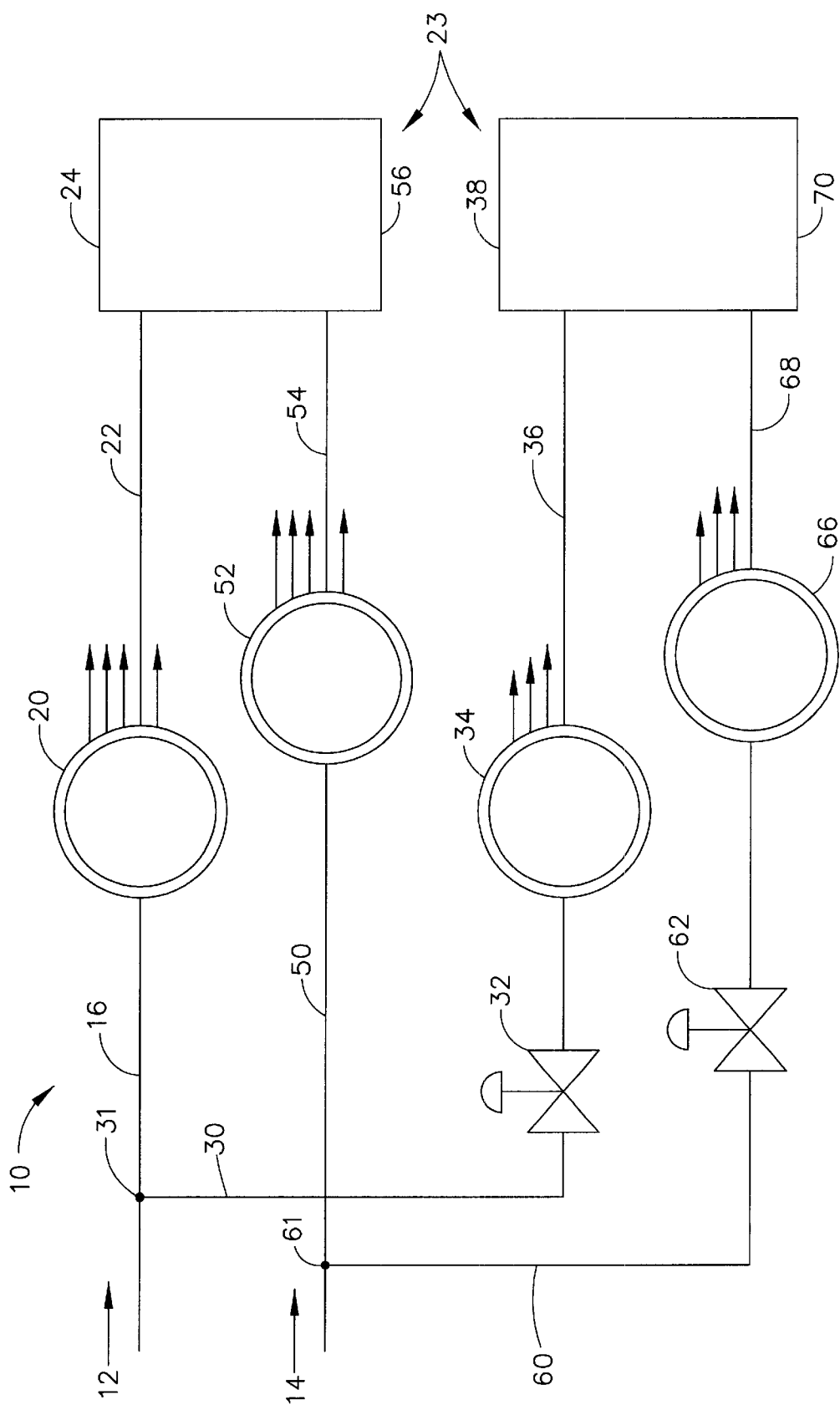
FIG. 1 is a schematic illustration of a fuel delivery system for operating a fuel nozzle staging for a gas turbine engine.

FIG. 1 is a schematic illustration of a fuel delivery system 10 for fuel nozzle staging for a gas turbine engine (not shown). Fuel delivery system 10 includes a steam circuit 12 and a gas circuit 14 which respectively deliver a first gas, i.e. steam, and a first fuel, i.e. gas, to the gas turbine engine. Steam circuit 12 and gas circuit 14 are both metered and sized to achieve a pressure ratio within fuel delivery system 10 appropriate for the fluid being delivered to the gas turbine engine. Steam circuit 12 delivers a metered steam flow to the gas turbine engine and gas circuit 14 delivers a metered fuel flow to the gas turbine engine.

Steam circuit 12 includes a connecting line 16 which extends from a metering valve (not shown) to a primary manifold 20. The metering valve is positioned between a steam supply source (not shown) and connecting line 16. The operation of a metering valve for controlling a flow of steam is well known. Manifold 20 is connected to a connecting line 22 which extends from manifold 20 to a fuel nozzle sub-system 23 and includes a plurality of fuel nozzles 24. In one embodiment, manifold 20 is a primary steam manifold. Fuel nozzles 24 are connected to the gas turbine engine and deliver steam to the gas turbine engine during initial operation of the engine and while the gas turbine engine is operating at an idle speed. In one embodiment, fuel nozzles 24 are primary fuel nozzles and are available from Parker Hannifin, 6035 Parkland Blvd., Cleveland, Ohio.

A connecting line 30 is connected to connecting line 16 between manifold 20 and the steam circuit metering valve. The steam circuit metering valve is connected between the steam supply source and connecting line 16, upstream of a connection 31 with line 30. Connecting line 30 extends from connecting line 16 to a staging valve 32. Staging valve 32 controls the flow of steam from connecting line 16 to a secondary manifold 34. Staging valve 32 is sized to accommodate a maximum steam flow for secondary manifold 34 for a secondary steam flow being supplied by fuel delivery system 10. In one embodiment, secondary manifold 34 is a secondary steam manifold. Secondary manifold 34 is connected to a connecting line 36 which extends from secondary manifold 34 to a plurality of fuel nozzles 38 of fuel sub-system 23. Fuel nozzles 38 are connected to the gas turbine engine and deliver the secondary steam and secondary gas flows to the gas turbine engine once the gas turbine engine has been operating for a predetermined length of time and is being accelerated from the initial idle speed. In one embodiment, fuel nozzles 38 are secondary fuel nozzles and are available from Parker Hannifin, 6035 Parkland Blvd., Cleveland, Ohio.

Gas circuit 14 includes a connecting line 50 which extends from a metering valve (not shown) to a primary manifold 52. The metering valve is positioned between a fuel supply source (not shown) and connecting line 50. In one embodiment, the fuel supply source is a natural gas supply source. Manifold 52 is connected to a connecting line 54 which extends from manifold 52 to a plurality of fuel nozzles 56 of fuel sub-system 23. In one embodiment, manifold 52 is a primary gas manifold. Fuel nozzles 56 are connected to the gas turbine engine to deliver the first fuel to the engine during initial operation of the gas turbine engine and while the gas turbine engine is operating at an idle speed. In one embodiment, fuel nozzles 56 are primary fuel nozzles and are available from Parker Hannifin, 6035 Parkland Blvd., Cleveland, Ohio.

A connecting line 60 is connected to connecting line 50 between manifold 52 and the gas circuit metering valve. The gas circuit metering valve is connected between the fuel supply source and connecting line 50, upstream of a connection 61 with line 60. Connecting line 60 extends from connecting line 50 to a staging valve 62. Staging valve 62 controls the flow of the fuel from connecting line 50 to a secondary manifold 66. Staging valve 62 is sized to accommodate a maximum flow for secondary manifold 66 for the second fuel being supplied by fuel delivery system 10. In one embodiment, secondary manifold 66 is a secondary gas manifold. Secondary manifold 66 is connected to a connecting line 68 which extends from manifold 66 to a plurality of fuel nozzles 70 of fuel sub-system 23. Fuel nozzles 70 are connected to the gas turbine engine and deliver the fuel to the gas turbine engine once the gas turbine engine has been operating with a predetermined load at a predetermined power level and is being accelerated from the initial synchronous idle speed. In one embodiment, fuel nozzles 70 are secondary fuel nozzles and are available from Parker Hannifin, 6035 Parkland Blvd., Cleveland, Ohio.

In operation, fuel delivery system 10 is capable of delivering the steam and fuel such that the gas turbine engine is capable of starting using a metered gas flow. To start the gas turbine engine, fuel delivery system 10 stages the metered gas flows between primary nozzles 24 and 56. In one embodiment, fuel delivery system 10 includes 20 primary nozzles 24 and 56. During the gas turbine engine start and during low power modes and idle power modes, the first fuel and steam are delivered to the gas turbine engine through primary manifolds 20 and 52 to primary fuel nozzles 24 and 56 respectively. While the first fuel and steam are being delivered to primary manifolds 20 and 52, staging valves 32 and 62 are closed to prevent the fuel and the steam from being delivered to secondary manifolds 34 and 66. Delivering the first fuel and steam through primary nozzles 24 and 56 during low power conditions and idle operations of the gas turbine engine enhances a low pressure ratio of fuel delivery system 10 which improves flammability limits for the gas turbine engine. Additionally, it has been determined that fuel and control system 10 may reduce such emission levels up to four times greater than known non-premix fuel and control systems.

In an alternative embodiment, staging valve 32 and staging valve 62 provide a pilot flow when staging valves 32 and 62 are in a fully closed position (not shown). The pilot flow provides a minimum positive gas flow to manifolds 34 and 66 to prevent potentially damaging combustion gases from back-flowing from the gas turbine engine into manifolds 34 and 66.

The gas turbine engine is then accelerated from synchronous idle operation. Once the engine reaches a predetermined operational speed, fuel delivery system 10 directs gas flow to secondary manifolds 34 and 66 by gradually opening steam circuit staging valve 32 and gas circuit staging valve 62. As staging valves 32 and 62 are opened, the first fuel and steam are directed into manifolds 34 and 66 respectively. Simultaneously, the first fuel and steam are still being directed into primary fuel nozzles 24 and 56 through manifolds 20 and 52 respectively. Shortly thereafter, secondary steam and gas flows from secondary fuel nozzles 38 and 70 respectively and into the gas turbine engine. In one embodiment, fuel delivery system 10 includes 10 secondary fuel nozzles 38 and 70. Simultaneously, the steam and the first fuel are still being directed into primary fuel nozzles 24 and 56 through manifolds 20 and 52 respectively.

Figure 2:
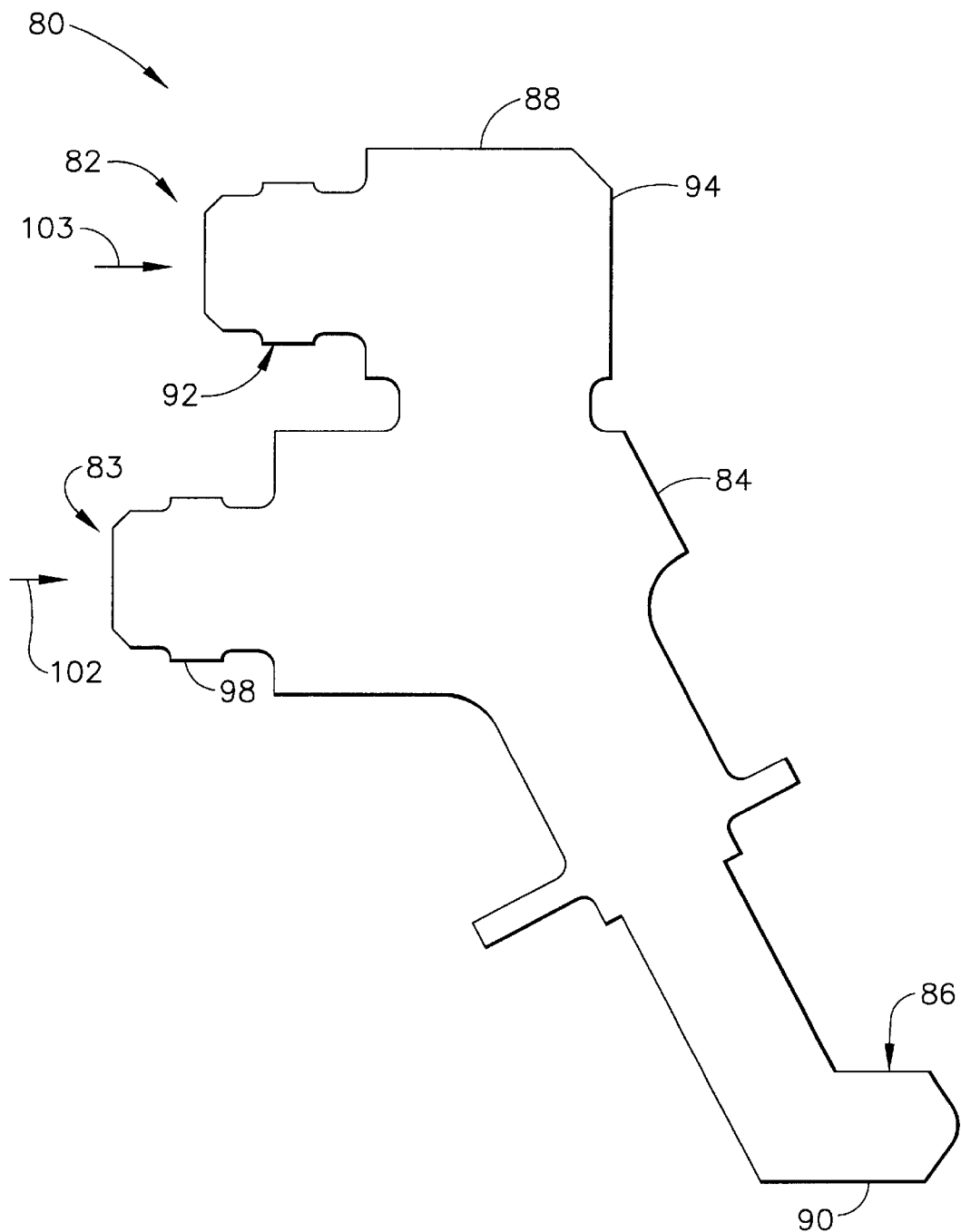
FIG. 2 is a side elevational view of one embodiment of a dual fuel nozzle that could be used in conjunction with the fuel delivery system shown in FIG. 1.

FIG. 2 is a side elevational view of one embodiment of a dual fuel nozzle 80 that could be used in conjunction with fuel and control system 10. Fuel nozzle 80 is similar to fuel nozzles 24, 38, 56, and 70 (shown in FIG. 1). In one embodiment, fuel nozzles 24, 38, 56, and 70 are each the same model fuel nozzle and have the same set of performance flow characteristics at all power operations. Therefore, the gas turbine engine exit temperature pattern factors and profiles are retained as the engine is accelerated and secondary fuel nozzles 38 and 70 deliver the gas and steam to the gas turbine engine.

Nozzle 80 includes a gas inlet 83, a steam inlet 83, a nozzle body 84, and a nozzle tip 86. Nozzle body 84 has a first end 88 and a second end 90. Inlet 82 is positioned adjacent first end 88 and nozzle tip 86 is positioned adjacent second end 90. Inlet 82 extends from nozzle body 84 and includes a coupling 92 which permits a connection to fuel circuit connection line 68 (shown in FIG. 1) or fuel circuit connection line 54. (shown in FIG. 1). Additionally, inlet 82 includes and elbow block 94 which connects coupling 92 to nozzle body 84. As first fuel flows through connecting lines 54 and 68 into coupling 92, elbow 94 directs the first fuel flow from coupling 92 towards nozzle body 84.

Steam inlet 83 extends from a coupling 98 attached to nozzle body 84. Coupling 98 connects nozzle 80 to steam circuit connecting line 22 (shown in FIG. 1) or steam circuit connecting line 36 (shown in FIG. 1). The steam enters steam inlet 83 in a direction 102 which is substantially parallel to a direction 103 in which the first fuel enters gas inlet 82. Once within nozzle body 84, the first fuel is mixed with the steam and directed towards nozzle tip 86.

The above described fuel delivery system for fuel nozzle staging for a gas turbine engine is cost-effective and reliable. The system includes a gas circuit and a fuel circuit wherein each circuit includes a primary manifold and a secondary manifold. The fuel delivery system delivers a steam and a first fuel to a turbine engine during initial operation through a plurality of primary fuel nozzles. Once the engine reaches a predetermined operational speed, the fuel delivery system also delivers the steam and the first fuel to the gas turbine engine through a plurality of secondary fuel nozzles. Accordingly, a fuel delivery system is provided for fuel nozzle staging for a gas turbine engine which eliminates more costly fuel delivery systems and provides a user with a reliable, flexible, and aerate fuel delivery system for a gas turbine engine.

While the invention has been described in terms of various specific embodiments, those skilled in the art will recognize that the invention can be practiced with modification within the spirit and scope of the claims.

What is claimed is:

1. A method for operating a gas turbine engine using a fuel delivery system including at least a first primary manifold, a second primary manifold, and a fuel nozzle sub-system, the fuel nozzle sub-system is connected to the manifolds and includes a plurality of primary fuel nozzles and a plurality of secondary fuel nozzles, said method comprising the steps of:

supplying steam and a first fuel to the fuel delivery system during initial engine operation; and directing the steam and the first fuel through the first primary manifold, the second primary manifold, and the fuel nozzle sub-system.

2. A method in accordance with claim 1 wherein the fuel delivery system further includes a plurality of secondary manifolds, said method further comprising the steps of:

accelerating the gas turbine engine from an idle speed; and directing steam and the first fuel through at least one secondary manifold after the gas turbine engine has operated at a predetermined power level with a predetermined load.

3. A method in accordance with claim 2 wherein the fuel delivery system further includes a plurality of staging valves, said step of directing steam and the first fuel through at least one secondary manifold further comprising the step of controlling the flow of the steam and the first fuel with a plurality of staging valves.

4. A method in accordance with claim 3 wherein the secondary nozzles are configured to receive steam and the first fuel after the gas turbine engine has operated at the predetermined power level, said step of accelerating the gas turbine engine comprising the step of directing steam and the first fuel to the secondary nozzles.

5. A method in accordance with claim 4 wherein the plurality of primary nozzles includes 20 primary nozzles, said step of directing the first gas and the first fuel through the first primary manifold, the second primary manifold, and the fuel nozzle sub-system comprises the step of supplying the 20 primary nozzles with steam and the first fuel.

6. A method in accordance with claim 5 wherein the plurality of secondary nozzles includes 10 secondary nozzles, said step of accelerating the gas turbine engine from an idle speed further comprises the step of simultaneously supplying the 20 primary nozzles and the 10 secondary nozzles with steam and the first fuel.

* * * * *